May 28, 1940.  A. H. J. DE L. SAINT GENIES  2,202,355

METHOD AND APPARATUS FOR COPYING LENTICULAR FILMS

Filed Nov. 25, 1938

INVENTOR.
Anne Henri Jacques
de Lassus Saint Genies.
BY
Stone, Boyden & Mack.
ATTORNEYS.

Patented May 28, 1940

2,202,355

UNITED STATES PATENT OFFICE 2,202,355

METHOD AND APPARATUS FOR COPYING LENTICULAR FILMS

Anne Henri Jacques de Lassus Saint Genies, Versailles, France

Application November 25, 1938, Serial No. 242,383
In France November 5, 1936

6 Claims. (Cl. 88—24)

This application is a continuation in part of the co-pending application Serial No. 172,290, filed November 1, 1937.

The present invention relates to the copying of lenticular films in accordance with the method disclosed in the co-pending application Serial No. 87,306, filed June 25, 1936, as applied to the case in which the films are unrolled continuously.

The prior application discloses a system for copying lenticular films by projection in which shutters containing relatively narrow slots are moved in front of the original and copy films in such a manner that relatively narrow and homologous portions of the two films are simultaneously illuminated. In addition to the principal optical copying system, a fixed optical system is generally arranged adjacent the original film or adjacent the copy film, or additional optical systems are arranged adjacent both films.

The original and copy film may be so arranged that the lenticulations of the one are parallel to those of the other or alternatively so arranged that the lenticulations of the two films are relatively inclined or perpendicular. More particularly, the present invention relates to means for permitting variation of the aperture of the copying optical system in order to enable a copy film to be obtained in which the aperture of the elementary beams is different from the aperture of the elementary beams of the original.

The invention consists essentially in the control of the distance between the slot illuminating the original film and the said original film, the said slot being fixed in space as indicated in the said co-pending application, and in curving the original film and, if desired, the copy film also. In effecting this curvature, the aforesaid additional optical system, which is placed between the original film and the copying optical system, must be taken into account.

The separate and combined use of the above means for the printing by projection of collimated original films on copy films having crossed lenticulations will be described. In this particular application, the stationary slots S and S' may be retained and the two films may be displaced with respect to these slots.

The invention will be fully described with reference to the acompanying drawing in which.

Functioning in combination with the objective O, the auxiliary lens B necessarily introduces a curvature of the image projected on the copy which affects the clearness thereof. This curvature is known in geometrical optics under the name of "Petzwal's curvature"; it is a function of the index of refraction and the focal length of the lens B. It is seen that this disturbance can be remedied by correcting this curvature in a plane passing through the principal axis of the optical system by giving a curvature of suitable direction to the section of the original film F through this plane. The direction of this curvature depends, of course, upon the sign of the lens B.

Figure 1:
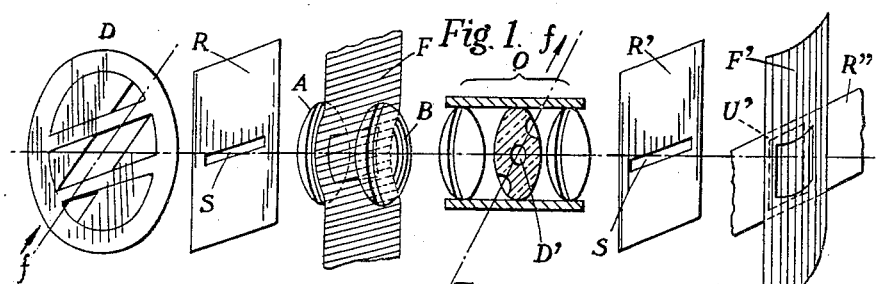
Fig. 1 is a general perspective view of the apparatus according to the invention, the two films being adapted to move continuously, the original film having transverse lenticulations and the copy film longitudinal lenticulations.

But the curvature of the copy image will not be corrected in this way in a plane orthogonal to the previous plane. To achieve this, it is sufficient to give to the copy film a suitable curvature according to its section through this second plane. Fig. 1 illustrates this for the case where the lens B is convergent and the bending of F is convex towards a source about a horziontal axis; the bending which follows for the copy film is then concave towards the objective O about a vertical axis.

Figure 3:
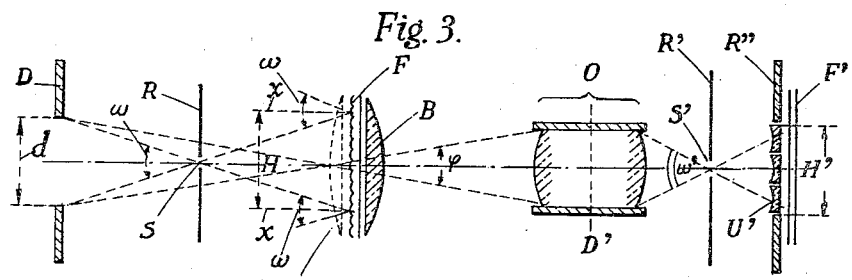
Fig. 3 shows an arrangement in which, the films being strictly flat, the aperture $\phi$ of the objective is smaller than the aperture $\omega$ of the elementary beams.

The screen R" in relation to which the film F moves, may comprise the optical elements U', such as are shown in Fig. 3, in order to spread out the elementary images in the manner disclosed in the main application, Serial No. 172,290. In the case of Fig. 1 where only the films move, the optical system situated at U' are fixed as well as the screen R".

Figure 2:
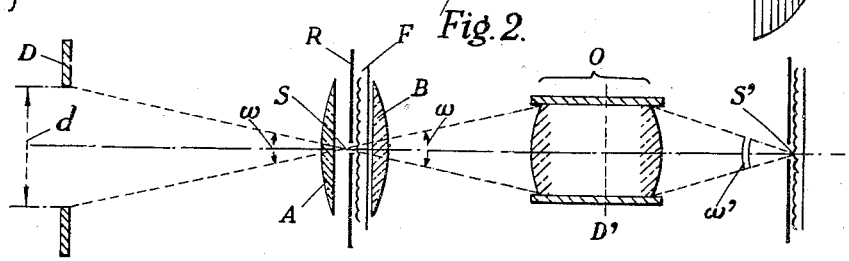
Fig. 2 shows an arrangement in which the copying objective, seen from the film, has the same aperture $\omega$ as the elementary beams of the original film.

The fixed slots S and S' are arranged at suitable distances from the two films in order to allow for the apertures of D and O being brought into conformity with the original film, of which the axes of the elementary beams are collimated. If these distances of S and S' are nil or very small, as illustrated by Fig. 2, the apertures $\omega$ of the active surface d and of the objective O, as they are seen from the film F, are necessarily equal to one another and to the aperture of the elementary beams of this film; the aperture ω' is controlled by the enlargement chosen, and it is difficult to apply the additional optical systems for spreading the microscopic spots on the copy film.

When the slot S is moved away from the film F and, consequently, the slot S' is moved away from the film F'', as illustrated by Fig. 3, d and the pupil of the objective O can be reduced more, the further S is removed from F. The same value of ω may thus be retained and a reduced value may be given to φ. On the other hand, if the value of ω' is not suitable, there may be interposed between R' and F'', the screen R'' with its auxiliary optical system U', in order to act in an independent manner on the spreading of the elementary miscroscopic spots.

On this assembly the curvature of film F is supposed to be zero, that is, the axes xx are parallel as indicated by the figure. As in the preceding figure, only the films move, all the remainder being fixed.

It is seen that in order to vary the aperture of the objective O, the appropriate value of the spacing between S and F is chosen and that in order to separate the microscopic spots on F'', the optical systems U' are employed, that is, in this manner much latitude is had for the establishment of the apparatus illustrated.

Figure 4:
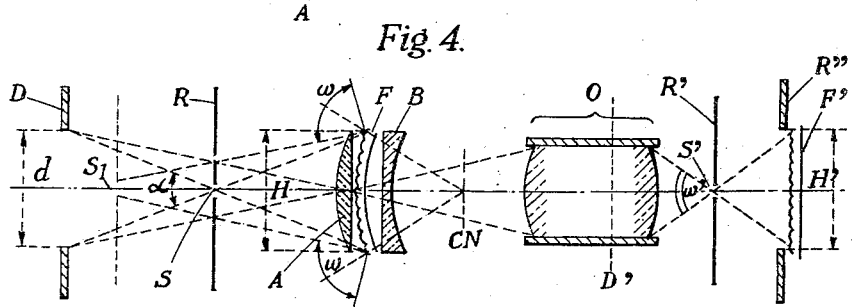
Fig. 4 shows an arrangement in which the original film is curved concavely towards the objective.

Another means of acting on the aperture of D is illustrated in Fig. 4; it is the bending of the original film F about an axis parallel to the direction of its lenticulations.

It is understood that this bending, Fig. 4, would be without effect on the distance of the active source surface and its size, if the slot S were very close to the film F, each diopter being illuminated only at the very short moment of its passage in front of the slot S, as in the above case, top of Fig. 2. But it is seen, on the other hand, that this bending has a substantial effect on the distance of D and its size if S is relatively remote from F.

In Fig. 4, the angle α at which D is seen from S may be smaller than ω, the angle of aperture of the elementary beams of the film F, and d may be smaller than in the case of Fig. 3.

In this case, it is possible to work as follows: To a given curvature of the film F there is made to correspond the lens A, convergent for example, which gives a virtual image at $S_1$ of the slot arranged at S (nearer to F than if use were not made of a lens A). This image ensures the suitable incidence of the luminous rays at the edges of the zone H, illuminated by the active surface of source D (seen from S at an angle α less than ω, but nevertheless greater than the angle at which D could be seen from F without lens A). This lens A gives at the same time a first real image of D at C.N, which, in the known manner, is taken up by B in order to be definitely placed at D'. It is understood that, to a given curvature of the film F, to a given position of S and to a size of illuminated zone H on the film (that is, at a given angle α) there may always be made to correspond a position of source D, the image of which is constructed at C.N, or, in a more general manner, that being given three of these parameters out of four, the fourth can be deduced.

Figure 5:
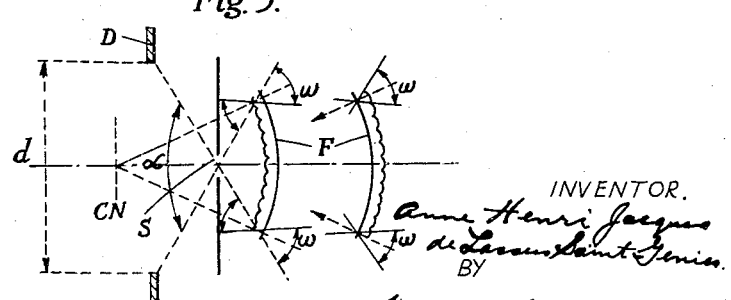
Fig. 5 shows an arrangement in which the original film is curved concavely toward the source of light.

In the case of concave bending towards D, Fig. 5, it is seen, on the contrary, that the active surface of the source D must be seen from S at an angle α greater than the aperture ω of the elementary beams of the film F.

In the case of Fig. 4, the orientation of the lenticulations of the film F may be optional; it may be turned towards the luminous source or towards the objective O.

In all the examples given above, consideration of Figs. 3, 4 and 5 shows that if for example the relative aperture of O is given, as well as the aperture of the elementary beams, the sizes of these two apertures being supposed different, the position of the plane D and the foci of the lenses A and B being also given as usual, the effective size d of the light source in the plane D can immediately be determined by the angle φ which measures the relative aperture of the objective O, and the position of S (or, more precisely, of its virtual image $S_1$ given by the lens A if the latter is employed) is determined in turn by the following considerations:

(a) In the case of Fig. 3 where the film F is flat, this distance is simply the function of the relation which exists between the angles ω and φ;

(b) In the case of Figs. 4 and 5 the distance of the image $S_1$ of S (or of S if lenses A are not employed) is again the function of the convex or concave curvature of the film. It is sufficient to plot the path of the marginal rays of the elementary chambers at the edges of the illuminated zone H of the film whilst taking into account the sense and value of the curvature of the latter, in order to determine the position of the image $S_1$ and consequently the position of S.

I claim:

1. In a method of optically reproducing an original film having cylindrical lenticulations on a copy film having like lenticulations, in which the said films move continuously in their corresponding gates in front of fixed slots which illuminate on the said film homologous parts by means of a principal optical copying system and auxiliary systems in the neighbourhood of the said films; selecting the distance between the original film and the fixed slot which illuminates it and giving the original film a cylindrical curvature the axis of which is parallel to the slot illuminating the original film and to the lenticulations of said original film, the said selection of the distance between the slot and the original film being determined by the geometrical tracing of the marginal rays impinging on the edges of the zone illuminated at any moment on the said original film with a given curvature of the said film in such manner that the angular apertures of the elementary beams of the copy film are made different from the angular apertures of the elementary beams of the original film independently of variation of the relative sizes of the macroscopic images of the two films.

2. In a method of optically reproducing an original film having cylindrical lenticulations on a copy film having like lenticulations, in which the said films move continuously in their corresponding gates in front of fixed slots which illuminate on the said films homologous parts by means of a principal optical copying system and auxiliary systems in the neighbourhood of the said films; selecting the distance between the original film and the fixed slot which illuminates it and giving the original film a cylindrical curvature the axis of which is parallel to the slot illuminating the original film and to the lenticulations of said original film, the lenticulations of the two films not being parallel, the said selection of the distance between the slot and the original film being determined by the geometrical tracing of the marginal rays impinging on the edges of the zone illuminated at any moment on the said original film with a given curvature of the said film in such manner that the angular apertures of the elementary beams of the copy film are made different from the angular apertures of the elementary beams of the original film independently of variation of the relative sizes of the macroscopic images of the two films.

3. In a method of optically reproducing an original film having cylindrical lenticulations on a copy film having like lenticulations, in which the said films moving continuously in their corresponding gates in front of fixed slots which illuminate on the said films homologous parts by means of a principal optical copying system and auxiliary systems in the neighbourhood of the said films; the step which permits the use of a principal optical system having a relative aperture independent of the angular aperture of the elementary luminous beams of the said films, said step consisting in selecting the distance between the original film and the fixed slot which illuminates it and in giving the original film a cylindrical curvature the axis of which is parallel to said slot and to the lenticulations of said original film, the lenticulations of the two films not being parallel, whilst giving the copy film a cylindrical curvature about an axis orthogonal to the axis of curvature of the original film, said latter curvature taking into account moreover the curvature of the image produced by the additional lenses completing in the known manner the principal copying optical system, the said selection of the distance between the slot and the original film being determined by the geometrical tracing of the marginal rays impinging on the edges of the zone illuminated at any moment on the said original film with a given curvature of the said film.

4. In apparatus for the optical reproduction of an original film having cylindrical lenticulations on a copy film having like lenticulations, the said films moving continuously in their corresponding gates in front of fixed slots which illuminate on the said films homologous parts by means of a principal optical copying system and auxiliary systems in the neighbourhood of the said films; means permitting the relative aperture of the principal optical system to be rendered independent of the angular aperture of the elementary luminous beams of the said films, said means consisting in selecting the distance between the original film and the fixed slot which illuminates it and in giving the original film a cylindrical curvature the axis of which is parallel to the slot illuminating the original film and to the lenticulations of said original film, and a gate for the copy film curved cylindrically about an axis orthogonal to the axis of curvature of the gate for the original film.

5. In the method of copying lenticular films by projection in which the original and copy film are arranged in conjugation with respect to a principal copying optical system and are unrolled continuously behind fixed shutters having slots parallel to the lenticulations of the original film whereby homologous and parallel parts of said films are simultaneously illuminated; bending the original film cylindrically about an axis parallel to the slot illuminating the original film to a degree proportional to the distance of the first slotted screen from the original film whilst bending the copy film cylindrically about an axis orthogonal to the axis of curvature of the original film to a degree proportional to the distance of the second slotted screen from the copy film, whereby there may be employed a light source and a principal copying objective having a diaphragm of dimension smaller than the aerial images constructed by said films.

6. In a method of optically reproducing an original film having cylindrical lenticulations on a copy film having like lenticulations, in which the said films move continuously in their corresponding gates in front of fixed slots which illuminate on the said films homologous parts by means of a principal optical copying system and auxiliary systems in the neighbourhood of the said films; selecting the distance between the original film and the fixed slot which illuminates it whilst using a light source and copying objective of angular aperture different from that of the elementary beams of the original film, the said selection of the distance between the slot and the original film being determined by the geometrical tracing of the marginal rays impinging on the edges of the zone illuminated at any moment on the said original film, in such manner that the angular aperture of the elementary beams of the copy film are made different from the angular aperture of the elementary beams of the original film independently of variation of the relative sizes of the macroscopic images on the two films.

ANNE HENRI JACQUES DE LASSUS
                                          ST. GENIES.